(12) United States Patent
Hanisch et al.

(10) Patent No.: US 12,291,270 B2
(45) Date of Patent: May 6, 2025

(54) CONTAINER ARRANGEMENT FOR A VEHICLE

(71) Applicant: AUDI AG, Ingolstadt (DE)

(72) Inventors: Thomas Hanisch, Dollnstein (DE); Silke Rudolph, Wellheim (DE); Carsten Bär, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 776 days.

(21) Appl. No.: 17/253,797

(22) PCT Filed: Jul. 25, 2019

(86) PCT No.: PCT/EP2019/069992
§ 371 (c)(1),
(2) Date: Dec. 18, 2020

(87) PCT Pub. No.: WO2019/243638
PCT Pub. Date: Dec. 26, 2019

(65) Prior Publication Data
US 2021/0261196 A1 Aug. 26, 2021

(30) Foreign Application Priority Data
Sep. 19, 2018 (DE) .................. 10 2018 215 948.3

(51) Int. Cl.
*B62D 21/16* (2006.01)
*B60K 15/077* (2006.01)
*B62D 21/17* (2006.01)

(52) U.S. Cl.
CPC ............ *B62D 21/16* (2013.01); *B60K 15/077* (2013.01); *B62D 21/17* (2013.01)

(58) Field of Classification Search
CPC .................. B62D 21/16; B60K 15/077; B60K 2015/03421; B60K 2015/03065; B60K 15/073
(Continued)

(56) References Cited

U.S. PATENT DOCUMENTS

| 3,664,904 A * | 5/1972 | Cook ................ B32B 27/308 220/560.04 |
| 2002/0066737 A1* | 6/2002 | Stack ................ B60K 15/077 220/564 |
| 2013/0264347 A1* | 10/2013 | Fujita ................ B60K 15/067 428/36.5 |

FOREIGN PATENT DOCUMENTS

| DE | 2128318 A1 | 12/1972 |
| DE | 102005016462 A1 | 10/2006 |

(Continued)

OTHER PUBLICATIONS

English translation of the International Preliminary Report on Patentability issued on Mar. 23, 2021, in connection with corresponding International Application No. PCT/EP2019/069992; 6 pages.

(Continued)

*Primary Examiner* — Jeffrey R Allen
(74) *Attorney, Agent, or Firm* — Maier & Maier, PLLC

(57) ABSTRACT

A container assembly for a vehicle, having a container which is arranged in a closed cavity of a vehicle body structure, and methods for producing a vehicle body structure having such a container assembly for a vehicle. At least one mechanical interface having a container-side first attachment part and a vehicle-side second attachment part is provided, which is embodied both for fastening the container on the vehicle body structure and also for filling and/or emptying the container.

19 Claims, 1 Drawing Sheet

(58) Field of Classification Search
USPC .................................................. 220/562, 563
See application file for complete search history.

(56) References Cited

FOREIGN PATENT DOCUMENTS

| | | |
|---|---|---|
| DE | 102014001092 A1 | 7/2015 |
| DE | 102015106427 A1 | 10/2016 |
| DE | 102015012100 B3 | 2/2017 |
| EP | 2555277 A1 | 2/2013 |
| EP | 2801512 A1 | 11/2014 |

OTHER PUBLICATIONS

German Examination Report issued on Sep. 27, 2019 in corresponding German Application No. 10 2018 215 948.3; 16 pages; Machine translation attached.
International Search Report (with English translation) and Written Opinion (with Machine translation) issued on Oct. 16, 2019 in corresponding International Application No. PCT/EP2019/069992; 17 pages.

* cited by examiner

CONTAINER ARRANGEMENT FOR A VEHICLE

FIELD

The invention relates to a container assembly for a vehicle and a method for producing a vehicle body structure having such a container assembly.

BACKGROUND

Container assemblies for vehicles are known in numerous variations. In current vehicle concepts, various containers are used for storing liquids. Thus, for example, water can be stored for the operation of injection systems or for sensor and window cleaning. Another application is, for example, storing ammonia-containing liquids for exhaust gas post-treatment (SCR-selective catalytic reduction). The required quantity of each liquid is in the range of 1 to 25 L. For this purpose, corresponding containers have to be integrated into the installation space of the vehicles, which is limited in any case. The attachment of the containers according to the current status results in a reduction of the vehicle volume usable by customers, for example in a passenger compartment or in the baggage compartment. It is therefore advantageous to integrate containers into vehicle body cavities existing in any case.

For example, a structural component for a motor vehicle is known from DE 10 2015 012 100 B3, which includes at least one cavity at least partially delimited by at least one wall element of the structural component and at least one access opening to the cavity. In this case, at least one cavity element, which forms a pressure accumulator, is arranged in at least one subregion of the cavity. The cavity element is supported at least in regions on the wall element. The cavity element is formed by injecting a prepolymer into the cavity and subsequently cross-linking it to form an elastomer.

However, this is not implementable in this way for body-integrated containers for liquids, since the vehicle body cavities are no longer accessible in the installation according to typical construction due to the constructive situation of the vehicle. Moreover, it can be considered to be disadvantageous for the overall structure if the vehicle if service openings, flaps, etc. have to be provided for accessibility. The containers can only be inserted into the vehicle body structure during the production of the vehicle body, but then also have to be able to withstand the entire manufacturing sequence including passing through the paint shop (passage through cathodic dip coating (CDC) bath, dryer oven).

SUMMARY

The invention is based on the object of providing a container assembly for a vehicle and a method for producing a vehicle body structure having such a container assembly, which uses existing vehicle body cavities without package loss and the reliable functionality of which is provided over the vehicle lifetime.

In order to provide a container assembly for a vehicle, which uses existing vehicle body cavities without package loss and the reliable functionality of which is provided over the vehicle lifetime, at least one mechanical interface having a container-side first attachment part and a body-side second attachment part is provided, which is embodied both for fastening the container on the vehicle body structure and also for filling and/or emptying the container.

The container assembly for a vehicle thus comprises a container which is arranged in a closed cavity of a vehicle body structure.

Moreover, a method for producing a vehicle body structure having at least one closed cavity and such a container assembly is proposed, which comprises the following steps: pre-finishing the vehicle body structure up to the point where accessibility to the cavity is still provided. Introducing the container into the still accessible cavity, wherein a material expandable due to temperature action is introduced between a shell of the container and a wall of the cavity formed by the vehicle body structure in such a way that a circumferentially formed gap remains between the shell of the container and the wall of the cavity formed by the vehicle body structure. Fixing the container by means of the mechanical interface. Closing possible openings of the container. Completing the vehicle body structure and closing the cavity. Heating the vehicle body structure in such a way that the expandable material expands, in particular during a coating process of the vehicle body structure, and fills up the circumferential gap at least in regions, and the container is thus further fixed.

Because of the design, there are many closed cavities, which could accommodate a liquid volume, in the vehicle body structure of vehicle bodies. In embodiments of the container assembly according to the invention, a dimensionally-stable flexible container, which is nonetheless close to the final contour, is introduced in the region of the vehicle body construction. This container is fixed at an interface with the vehicle body structure, wherein the interface is used at the same time as an adapter for filling and emptying the container in operation. The container can be constructed so that it can withstand the temperature stresses occurring during the passage through the dryer and possible volume change as a result of the thermal expansion.

In one advantageous embodiment of the container assembly, a material expandable due to temperature action can be introduced into a circumferentially formed gap between a shell of the container and a wall of the cavity formed by the vehicle body structure. The circumferential gap of the vehicle body structure advantageously simplifies the insertion of the container and enables, during a passage of the vehicle body structure through a CDC bath (CDC: cathodic dip coating), a CDC liquid to wash around the vehicle body structure and be deposited to form a corrosion protection and finally also be able to drain out of the cavity again. The expandable material can expand due to the heating of the vehicle body component after the passage through the CDC bath, so that the material expanded by temperature action fills up the circumferential gap between the shell and the wall of the cavity at least in regions. The container is thus fixed at multiple additional points on the vehicle body structure. Moreover, the expanded material prevents or reduces a relative movement of the container in relation to the surrounding vehicle body structure in driving operation. Shear stresses between the surfaces, in particular between container and sheet metal stops, passages, overlapping ends, burrs of the sheet metal plates, etc. can thus also be prevented or at least reduced, so that in the long term impermissible local damage of the container with leaks cannot occur.

In a further advantageous embodiment of the container assembly, the container can include an internal support structure for stabilizing and/or suppressing sloshing noises. Sloshing noises arising in driving operation in containers which are not completely filled with liquid, which can be perceived as annoying by the customers, can thus be prevented or at least reduced. For this purpose, the inner support structure can comprise at least one open-cell molded foam part or at least one ribbed injection-molded part. This enables a simple and cost-effective implementation of the supporting, but nonetheless flexible and permeable support structure, which prevents or at least reduces sloshing noises in operation of the vehicle.

In a further advantageous embodiment of the container assembly, the first attachment part can be embodied as an attachment plate, which can include at least one fluid duct and first fastening means, which can interact with second fastening means of the second attachment part to fasten the container on the vehicle body structure. The attachment plate can be formed, for example, from a metallic material, or also from plastic. For this purpose, the attachment plate can include, for example, a cylindrical shaft with or without thread, so that the attachment plate can be screwed or pressed together with the vehicle body structure. Moreover, the first attachment part can include means for supplying or discharging fluid and/or electrical contact means for contacting a sensor system arranged on the first attachment part.

In a further advantageous embodiment of the container assembly, the shell of the container can be constructed in multiple layers from natural rubber and/or synthetic rubber, which can be vulcanized accordingly. Furthermore, the first attachment part can be vulcanized into the shell of the container.

In a further advantageous embodiment of the method for producing a vehicle body structure, the expandable material can be applied as a layer at least in regions to an outside of the shell and/or to an inside of the wall of the cavity. For this purpose, the expandable material can be applied, for example, only to the outside of the shell or to the inside of the wall. Alternatively, the expandable material can be applied to both the outside of the shell and also the inside of the wall.

The features and feature combinations mentioned above in the description and the features and feature combinations mentioned hereinafter in the description of the figures and/or shown solely in the figures are usable not only in the respective specified combination, but rather also in other combinations or alone, without leaving the scope of the invention. Therefore, embodiments are also to be considered to be comprised and disclosed by the invention which are not explicitly shown or explained in the figures, but originate and are producible by separate feature combinations from the explained embodiments.

BRIEF DESCRIPTION OF THE FIGURES

An exemplary embodiment of the invention is illustrated in the drawings and is explained in greater detail in the following description. In the drawings, identical reference signs identify components or elements which execute identical or similar functions. In the figures.

DETAILED DESCRIPTION

Figure 1:
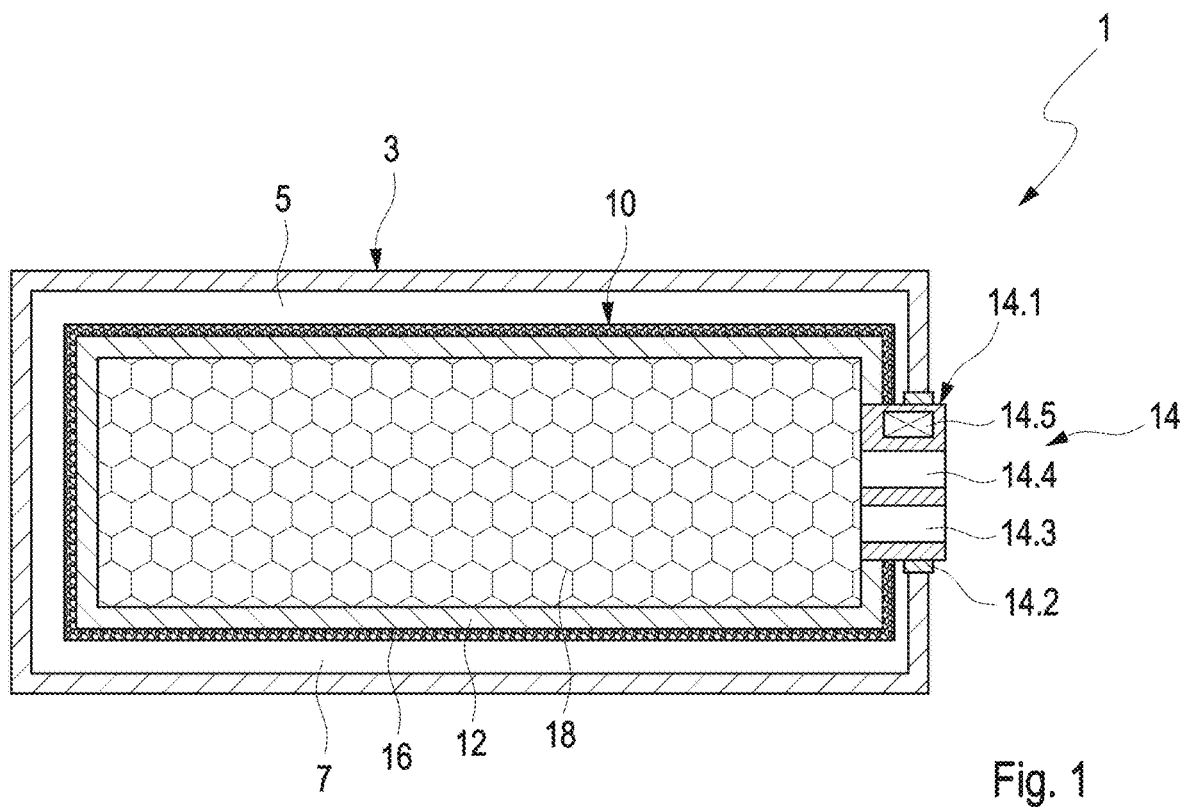
FIG. 1 shows a schematic sectional illustration of an exemplary embodiment of a container assembly according to the invention for a vehicle during the production of a vehicle body structure in a first state before heating of the vehicle body structure.
Figure 2:
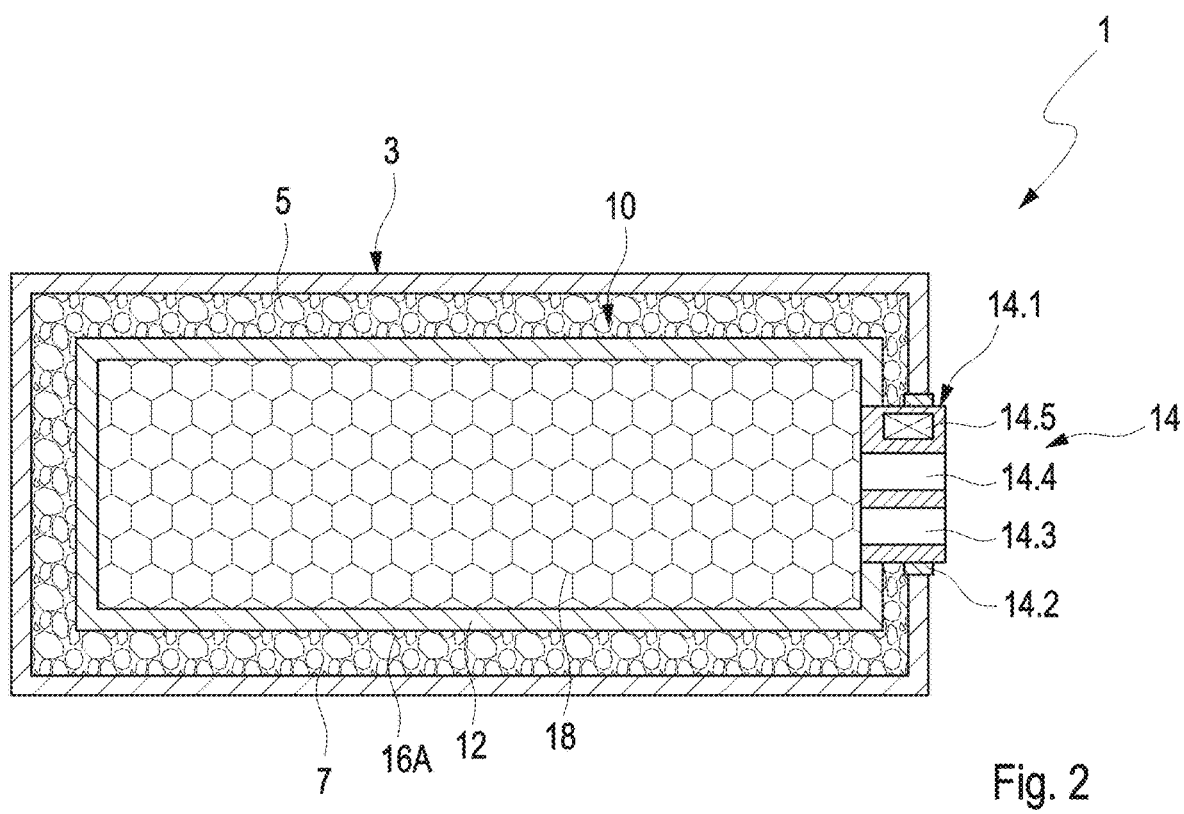
FIG. 2 shows a schematic sectional illustration of the container assembly according to the invention for a vehicle from FIG. 1 in a second state after the heating of the vehicle body structure.

As is apparent from FIGS. 1 and 2, the illustrated exemplary embodiment of a container assembly 1 for a vehicle includes a container 10, which is arranged in a closed cavity 5 of a vehicle body structure 3.

According to the invention, at least one mechanical interface 14 having a container-side first attachment part 14.1 and a body-side second attachment part 14.2 is provided, which is embodied both for fastening the container 10 on the vehicle body structure 3 and also for filling and/or emptying the container 10.

The vehicle body structure 3 preferably consists of metallic material such as steel and/or aluminum, the use of plastic components is also possible in isolated cases. For example, sheet metal plates, profiles, or cast parts can be present as semifinished products. Passages, holes, embossments, beads, etc. can be present in the components. Burrs can be present on the material edges. In order to enable the flooding of the cavity 5 with CDC liquid and the draining in the later process, holes having a diameter of approximately 20 mm are provided. The closed cavities 5 in the vehicle body structure result due to the arrangement and/or interleaving of the individual components of the vehicle body structure 3. The components are assembled in succession in the vehicle body construction, so that the cavities 5 are accessible at certain points in time during the manufacturing. After completion of the vehicle body construction, the cavities 5 are closed and are thus no longer accessible.

The container 10 includes a prefinished dimensionally stable but nonetheless flexible shell 12. The shell 12 of the container 10 is constructed in the illustrated exemplary embodiment close to the final contour in multiple layers from natural rubber and/or synthetic rubber, which are vulcanized accordingly. The number or thickness of the layers, the arrangement thereof, and the material composition thereof are adapted with respect to strength and resistance to the later functionality. Inserts, for example in the form of wire fabrics, between the individual layers are conceivable for mechanical support.

As is furthermore apparent from FIGS. 1 and 2, the shell 12 of the container 10 encloses an internal support structure 18, which remains in the container 10. The internal support structure 18 has the task of stabilizing the container 10 and preventing or at least suppressing sloshing noises. In the illustrated exemplary embodiment, the internal support structure 18 is formed as an open-celled molded foam part, which is adapted accordingly to the functional and manufacturing conditions, for example to the heat stress during the passage through the thermal dryer of the paint shop. Alternatively, the internal support structure 18 can also consist of ribbed injection-molded parts, which are produced, for example from glass-fiber-reinforced polyamide.

As is furthermore apparent from FIG. 1, a material expandable by temperature action is introduced into a circumferentially formed gap 7 between the shell 12 of the container 10 and a wall of the cavity 5 formed by the vehicle body structure 3. As is furthermore apparent from FIG. 1, in the illustrated exemplary embodiment, the expandable material is applied as a layer 16 only to an outside of the shell 12 of the container 10. The container 10 is formed close to the final contour, wherein the gap 7 remaining between the container 10 having the applied expandable layer 16 and the wall of the vehicle body structure 3 delimiting the cavity 5 preferably has a width of 5 to 10 mm, in order to provide a clearance for the installation of the container 10 and, in the later process during the production of the vehicle body structure 3, to enable the flooding of the cavity 5 with CDC liquid and the draining of the CDC liquid. The container 10 only touches the vehicle body structure 3 at the mechanical interface 14.

As is furthermore apparent from FIG. 2, the material of the expanded layer 16A expanded by temperature action completely fills up the circumferential gap 7 between the shell 12 and the wall of the cavity 5 in the illustrated exemplary embodiment. In an exemplary embodiment of the container assembly 1 which is not shown, the material of the expanded layer 16A expanded by temperature action only fills up the circumferential gap 7 between the shell 12 and the wall of the cavity 5 in regions or in sections. In a further exemplary embodiment which is not shown, the expandable material is applied as the layer 16 only to an inside of the wall of the cavity 5. Alternatively, the expandable material can be applied in a further exemplary embodiment of the container assembly 1 which is not shown both to the outside of the shell 12 and also to the inside of the wall of the cavity 5. In principle, it would also be possible to apply the expandable layer 16 to an additional carrier and to also fasten this in the cavity 5. Preferably an expandable foam based on rubber or epoxy resin, which can increase in volume in the process sequence, for example due to the heat action during the passage through a paint dryer, can be used as the expandable material. This material is dry to the touch after application, but is still reactive. Of course, other suitable expandable materials can also be used.

As is furthermore apparent from FIGS. 1 and 2, the first attachment part 14.1 embodied as an attachment plate is integrated at a point of the container 10 in the illustrated exemplary embodiment. In the illustrated exemplary embodiment, the first attachment part 14.1 is vulcanized into the multilayer shell 12. The first attachment part 14.1 embodied as an attachment plate can consist of a metallic material and/or of plastic. The first attachment part 14.1 comprises means for connecting the container 10 to the vehicle body structure 3. Moreover, the first attachment part 14.1 in the illustrated exemplary embodiment comprises a first fluid duct 14.3, which acts as a supply and can be connected to a supply hose, and a second fluid duct 14.4, which acts as a drain and can be connected to a drain hose. Furthermore, the first attachment part 14.1 comprises a sensor system 14.5, via which, for example, a fill level in the container 10 or properties of the filled fluid, for example temperature, pressure, etc., can be ascertained. The second attachment part 14.2 is provided on at least one point of the wall of the vehicle body structure 3 delimiting the cavity 5 as a counterpart to the first attachment part 14.1 having corresponding openings and fastening means. The first attachment part 14.1 and the second attachment part 14.2 together form the mechanical interface 14 for the fastening of the container 10 in the vehicle body structure 3 and for the filling and emptying of the container 10.

The method according to the invention for producing a vehicle body structure 3 having at least one closed cavity 5 and such an above-described container assembly 1 comprises the following steps: Pre-finishing the vehicle body structure 3 up to the point where accessibility to the cavity 5 is still provided. Introducing the container 1 into the still accessible cavity 5, wherein a material expandable by temperature action is introduced between the shell 12 of the container 10 and the wall of the cavity 5 formed by the vehicle body structure 3 so that a circumferentially formed gap 7 remains between the shell 12 of the container 10 and the wall of the cavity 5 formed by the vehicle body structure 3. Fixing the container 10 by means of the mechanical interface 14 and closing possible openings of the container 10, for example by valves, caps, etc. Completing the vehicle body structure 3 and closing the cavity 5. Heating the vehicle body structure 3 in such a way that the expandable material expands, in particular during a coating process of the vehicle body structure 3, and fills up the circumferential gap 7 at least in regions and the container 10 is thus further fixed.

During the coating process, the entire vehicle body passes through painting processes including cleaning, CDC flooding, painting, and drying. In the material selection for the container assembly 1 according to the invention, various process limits, for example low firing temperatures of up to 160° C. in the bottom region for a duration of up to approximately 20 minutes or high firing temperatures of up to 205° C. in the roof region for a duration of approximately 20 minutes during the cathodic dip coating (CDC) are taken into consideration. Moreover, various dryers are passed through, for example filler dryers, clear lacquer dryers having a standstill time of approximately 45 minutes at temperatures of up to 210° C. As a result of the temperature increase during the dryer pass, the internal pressure rises in the previously close container 10 by approximately 0.6 bar. The resulting force action outward leads to pressing of the container 10 or the shell 12 of the container having the layer 16 made of expandable material against the wall of the vehicle body structure 3 delimiting the cavity 5. In individual cases, pressure-reducing measures, for example overpressure valves or pressure-increasing measures, for example pre-tensioning with overpressure, can be performed if the respective application requires it.

During the first pass through a dryer, the material expands and the expanded layer 16A around the container 10 completely fills up the circumferential gap 7 between the shell 12 and the wall of the cavity 5 in the illustrated exemplary embodiment. Due to the pressing of the container 10 against the wall of the vehicle body structure 3 delimiting the cavity 5, the formation of a good adhesion of the expanded layer 16A on the surrounding surfaces is promoted. In the installation region, the attached closures of the container 10 are removed and corresponding hoses for the fluid ducts 14.3, 14.3 and electrical cables for the sensor 14.5 are attached.

LIST OF REFERENCE SIGNS 1 container assembly
3 vehicle body structure
5 cavity
7 gap
10 container
12 shell
14 mechanical interface
14.1 first (body-side) attachment part
14.2 second (container-side) attachment part
14.3 first fluid duct (supply)
14.4 second fluid duct (drain)
14.5 sensor system
16 expandable layer
16A expanded layer
18 support structure

The invention claimed is:

1. A container assembly for a vehicle, comprising:
  a container which is arranged in a closed cavity of a vehicle body structure, wherein a wall of the closed cavity is formed by the vehicle body structure; and
  at least one mechanical interface having a container-side first attachment part integrated at a point of the container and a body-side second attachment part provided on a wall of the vehicle body structure that delimits the closed cavity as a counterpart to the container-side first attachment part, the container only touches the vehicle body structure at the at least one mechanical interface, wherein the container-side first attachment part comprises a first fluid duct that is configured to fill the container and a second fluid duct that is configured to empty the container, a material configured to expand by temperature action is located in a circumferential gap between a shell of the container and a wall of the closed cavity formed by the vehicle body structure.

2. The container assembly according to claim 1, wherein the material configured to expand by temperature action completely fills up the circumferential gap between the shell and the wall of the cavity.

3. The container assembly according to claim 1, wherein the container further comprises:
an internal support structure configured to suppress sloshing noises.

4. The container assembly according to claim 3, wherein the internal support structure further comprises:
at least one open-cell molded foam part or at least one ribbed injection-molded part.

5. The container assembly according to claim 1, wherein the container-side first attachment part is embodied as an attachment plate, which includes at least one fluid duct and first fastening means, which interact with second fastening means of the body-side second attachment part to fasten the container on the vehicle body structure.

6. The container assembly according to claim 1, wherein the shell of the container comprises multiple layers of vulcanized natural rubber and/or synthetic rubber.

7. The container assembly according to claim 5, wherein the container-side first attachment part is vulcanized into the shell of the container.

8. A method for producing a vehicle body structure having at least one closed cavity and a container assembly according to claim 1, comprising the following steps:
pre-finishing the vehicle body structure up to the point where accessibility of the cavity is still provided,
introducing the container into the still accessible cavity, wherein a material expandable by temperature action is introduced between the shell of the cavity and the wall of the cavity formed by the vehicle body structure in such a way that a circumferentially formed gap remains between the shell of the container and the wall of the cavity formed by the vehicle body structure,
fixing the container by means of the mechanical interface,
closing possible openings of the container,
completing the vehicle body structure and closing the cavity,
heating the vehicle body structure in such a way that the expandable material expands, in particular during a coating process of the vehicle body structure, and fills up the circumferential gap at least in regions and the container is thus further fixed.

9. The method according to claim 8, wherein the expandable material is applied as a layer at least in regions to an outside of the shell and/or to an inside of the wall of the cavity.

10. The container assembly according to claim 1, wherein the container further comprises:
an internal support structure configured to suppress sloshing noises.

11. The container assembly according to claim 2, wherein the container further comprises:
an internal support structure configured to suppress sloshing noises.

12. The container assembly according to claim 1, wherein the container-side first attachment part is embodied as an attachment plate, which includes at least one fluid duct and first fastening means, which interact with second fastening means of the body-side second attachment part to fasten the container on the vehicle body structure.

13. The container assembly according to claim 2, wherein the container-side first attachment part is embodied as an attachment plate, which includes at least one fluid duct and first fastening means, which interact with second fastening means of the body-side second attachment part to fasten the container on the vehicle body structure.

14. The container assembly according to claim 3, wherein the container-side first attachment part is embodied as an attachment plate, which includes at least one fluid duct and first fastening means, which interact with second fastening means of the body-side second attachment part to fasten the container on the vehicle body structure.

15. The container assembly according to claim 4, wherein the container-side first attachment part is embodied as an attachment plate, which includes at least one fluid duct and first fastening means, which interact with second fastening means of the body-side second attachment part to fasten the container on the vehicle body structure.

16. The container assembly according to claim 2, wherein the shell of the container comprises multiple layers of vulcanized natural rubber and/or synthetic rubber.

17. The container assembly according to claim 3, wherein the shell of the container comprises multiple layers of vulcanized natural rubber and/or synthetic rubber.

18. The container assembly according to claim 4, wherein the shell of the container comprises multiple layers of vulcanized natural rubber and/or synthetic rubber.

19. The container assembly according to claim 5, wherein the shell of the container comprises multiple layers of vulcanized natural rubber and/or synthetic rubber.

* * * * *